(12) United States Patent
Johar et al.

(10) Patent No.: US 8,428,142 B2
(45) Date of Patent: Apr. 23, 2013

(54) SYSTEM AND METHOD FOR TRANSCODING DATA FROM ONE VIDEO STANDARD TO ANOTHER VIDEO STANDARD

(75) Inventors: Sumit Johar, Delhi (IN); Ravin Sachdeva, Delhi (IN)

(73) Assignee: STMicroelectronics International N.V., Amsterdam (NL)

( * ) Notice: Subject to any disclaimer, the term of this patent is extended or adjusted under 35 U.S.C. 154(b) by 1422 days.

(21) Appl. No.: 12/042,300

(22) Filed: Mar. 4, 2008

(65) Prior Publication Data
US 2008/0219356 A1    Sep. 11, 2008

(30) Foreign Application Priority Data
Mar. 4, 2008  (IN) .............................. 478/DEL/2007

(51) Int. Cl.
*H04N 11/04* (2006.01)
(52) U.S. Cl.
USPC .................................................. 375/240.24
(58) Field of Classification Search ............. 375/240.12, 375/240.16, 240.2, 240.24, 240.25, 240.27
See application file for complete search history.

(56) References Cited

U.S. PATENT DOCUMENTS

| | | | |
|---|---|---|---|
| 7,321,942 B2 * | 1/2008 | Flautner et al. ................. | 710/15 |
| 7,840,085 B2 * | 11/2010 | Nagaraj et al. ................ | 382/254 |
| 7,899,121 B2 * | 3/2011 | Chung ..................... | 375/240.16 |
| 7,903,731 B2 * | 3/2011 | Cho et al. ................. | 375/240.03 |
| 2007/0229703 A1 * | 10/2007 | Lu ................................ | 348/441 |
| 2009/0196344 A1 * | 8/2009 | Brown et al. ............ | 375/240.02 |
| 2010/0079606 A1 * | 4/2010 | Batur ........................ | 348/208.6 |

* cited by examiner

*Primary Examiner* — Dang Ton
*Assistant Examiner* — Nourali Mansoury
(74) *Attorney, Agent, or Firm* — Gardere Wynne Sewell LLP

(57) ABSTRACT

A system and method transcodes an input video bit stream having a first encoding profile into an output video bit stream having a second encoding profile. The system includes a first module and a second module. The system further includes a memory module. The first module decodes the input video bit stream for generating pixel data and macroblock specifications. The second module encodes the pixel data and the macroblock specifications for constructing the output video bit stream. The memory module includes a first buffer module and a second buffer module. The first buffer module stores the pixel data and the second buffer module stores the macroblock specifications.

17 Claims, 8 Drawing Sheets

SYSTEM AND METHOD FOR TRANSCODING DATA FROM ONE VIDEO STANDARD TO ANOTHER VIDEO STANDARD

PRIORITY CLAIM

The present application claims priority Indian Patent Application No. 478/Del/2007 filed Mar. 4, 2008 and Indian Provisional Application No. 478/Del/2007 filed Mar. 5, 2007, the disclosures of which are hereby incorporated by reference.

FIELD OF THE INVENTION

The present invention relates to communication technologies and specifically to a system and method for transcoding data from one video standard to another video standard.

BACKGROUND OF THE INVENTION

With the advancement of time, video coding technologies are becoming more widely used. Most digital video contents exist in the coded form for saving storage (for example, MPEG-2 technology defined by the Moving Picture Experts Group (MPEG)). Transcoding coded video contents from one format to another, from one bit rate to another and from one resolution to another is an indispensable operation in many multimedia applications, such as digital video broadcasting, video on demand (VOD), teleconferencing, long distance learning, and so on.

The simple way to perform video transcoding is to cascade a decoder and an encoder together. The cascaded decoder and the encoder, first performs a full decoding of an input stream and then performs a full encoding of a decoded raw video data. Since the encoder can optimize video quality at the target bit rate by estimating another set of motion vectors and re-allocating bits of each picture, the cascaded transcoder typically achieves better video quality than other transcoders. The transcoder is called a cascaded pixel domain transcoder (CPDT).

FIG. 1 illustrates a conventional transcoder 100 for converting MPEG-2 to VC1 format. The transcoder 100 receives incoming source video streams in a fully decoded form, and then re-encodes with desirable bit rate or format (VC1) with minimal degradation in the visual quality due to the transcoding. Transcoding algorithms which do not have a feedback loop in a reconstruction process suffer from a drift error. A cascaded pixel domain transcoder (CPDT) on the other hand, has the feedback loop present in a reconstruction path and hence does not suffer from the drift error. Systems which do suffer from the drift error (i.e. open loop systems) have to employ algorithmic modifications to eliminate the drift error. Hence, only for such cases, it depends on efficiency of such algorithms to eliminate drift.

However, due to the need of complete blinded motion estimation, this approach leads to a computational complexity. Due to the need of reordering twice the decoded pictures, a memory is required and also results in processing latency.

FIG. 2 illustrates a block diagram of a conventional transcoder 200. The transcoder 200 employs a restricted reuse of decoded data which consist mainly of decoded pixel data and also reuse motion vectors.

In one approach of the transcoder 200, only the MPEG-2 decoded pixel data and the motion vector information are reused by the H.264 encoder. All the other decisions pertaining to output coding mode for each MB, such as MB modes, a prediction direction, a picture type, a GOP structure, a DCT type, etc., is done by the encoder itself which is a highly time consuming process.

Some of the other conventional transcoders that exist decide the output macroblock types depending on the input macroblocks while downsizing (resolution downsampling) an input MPEG-2 HD video bit stream to an MPEG-2 SD output. This is done by estimating the output macroblock mode based on the spatial weight (based on sizes of overlapping areas of each of the input macroblocks with a correlation area that is correlated with the output macroblock) and a DCT weight (based on a number of zero DCT coefficients of each of the input macroblocks that overlap the correlation area) and hence is restricted to same input and output macroblock types.

Recently, there is a wide deployment of the MPEG-2 format for broadcast and consumer applications owing to the advent of new technologies in digital television (TV) and other digital technologies. A lot of MPEG-2 coded material in the form of DVD movies or personal videos from portable digital cameras has become ubiquitous in recent times. For all the latest applications like high definition TV (broadcast), video streaming on small networks (home), subscription services, video on demand over IP, web broadcast, new advanced codecs like VC1 with fundamental advantage of compressing video sequences much better than old standards, are the choices for coming years. Contents compressed with VC1 are being consumed by a wide range of wired and wireless consumer electronic devices, for example, mobile phones, DVD players, portable music players, car stereos, etc. Windows media content can also be delivered to consumers in physical formats. In fact, DVD forum has adopted the windows media video 9 (WMV-9) codec as mandatory for the next generation high definition (HD) DVD format. At the same time, all previously created, broadcasted or stored MPEG-2 material should be taken into account and provide compatibility for all transmissions still using MPEG-2 standard so that they do not become obsolete in future.

Therefore, there is a need of a system and methodology for transcoding data from one video standard to another video standard.

SUMMARY OF THE INVENTION

In an embodiment, a methodology provides a macroblock mode mapping for transcoding data from one video standard to another video standard.

In another embodiment, a system is provided that minimizes a drift error.

In yet another embodiment, a transcoder is provided which utilizes reuse of macroblock specifications for speeding up the conversion process.

An embodiment provides a system for transcoding an input video bit stream having a first encoding profile into an output video bit stream having a second encoding profile comprising: a first module for decoding the input video bit stream to generate pixel data and macroblock specifications; and a second module operatively coupled to the first module, said second module comprising a macroblock mapping module and a motion vector refinement module for encoding the pixel data and the macroblock specifications to construct the output video bit stream.

A further embodiment provides a system for encoding pixel data and macroblock specifications of a first encoding profile to construct an output video bit stream of a second encoding profile, said system comprising: a macroblock mapping module for receiving the macroblock specifications to generate a prediction value in one of an inter mode and an intra mode; a motion vector refinement module for generating the prediction value through a reference picture in the inter mode; a transform module for transforming a residual value, said residual value comprising a difference of a prediction value and a value of the pixel data; a second quantization module for quantizing the residual value for generating a quantized transform coefficient; an entropy encoding module for an entropy encoding of the quantized transform coefficient; a third quantization module for processing the quantized transform coefficients to obtain dequantized data; a second inverse transformation module for generating a difference frame; a second picture buffer receiving reconstructed frames to store; and a second motion compensation module receiving motion information from the motion vector refinement module and coupled to the picture buffer to produce a motion compensated frame.

A further embodiment provides a method for transcoding an input video bit stream having a first encoding profile into an output video bit stream having a second encoding profile comprising: decoding the input video bit stream to generate pixel data and macroblock specifications through a first module; storing the pixel data and the macroblock specifications in a memory module; and encoding the pixel data and the macroblock specifications for constructing the output video bit stream through a second module.

A further embodiment provides a computer program product utilizing a method for transcoding an input video bit stream having a first encoding profile into an output video bit stream having a second encoding profile, the computer program product comprising a computer readable medium configured with processor executable instructions, the computer program product comprising: decoding the input video bit stream to generate pixel data and macroblock specifications through a first module; storing the pixel data and the macroblock specifications in a memory module; and encoding the pixel data and the macroblock specifications for constructing the output video bit stream through a second module.

BRIEF DESCRIPTION OF DRAWINGS

The aforementioned aspects and other features of the present invention will be explained in the following description, taken in conjunction with the accompanying drawings, wherein.

DETAILED DESCRIPTION OF THE DRAWINGS

Figure 1:
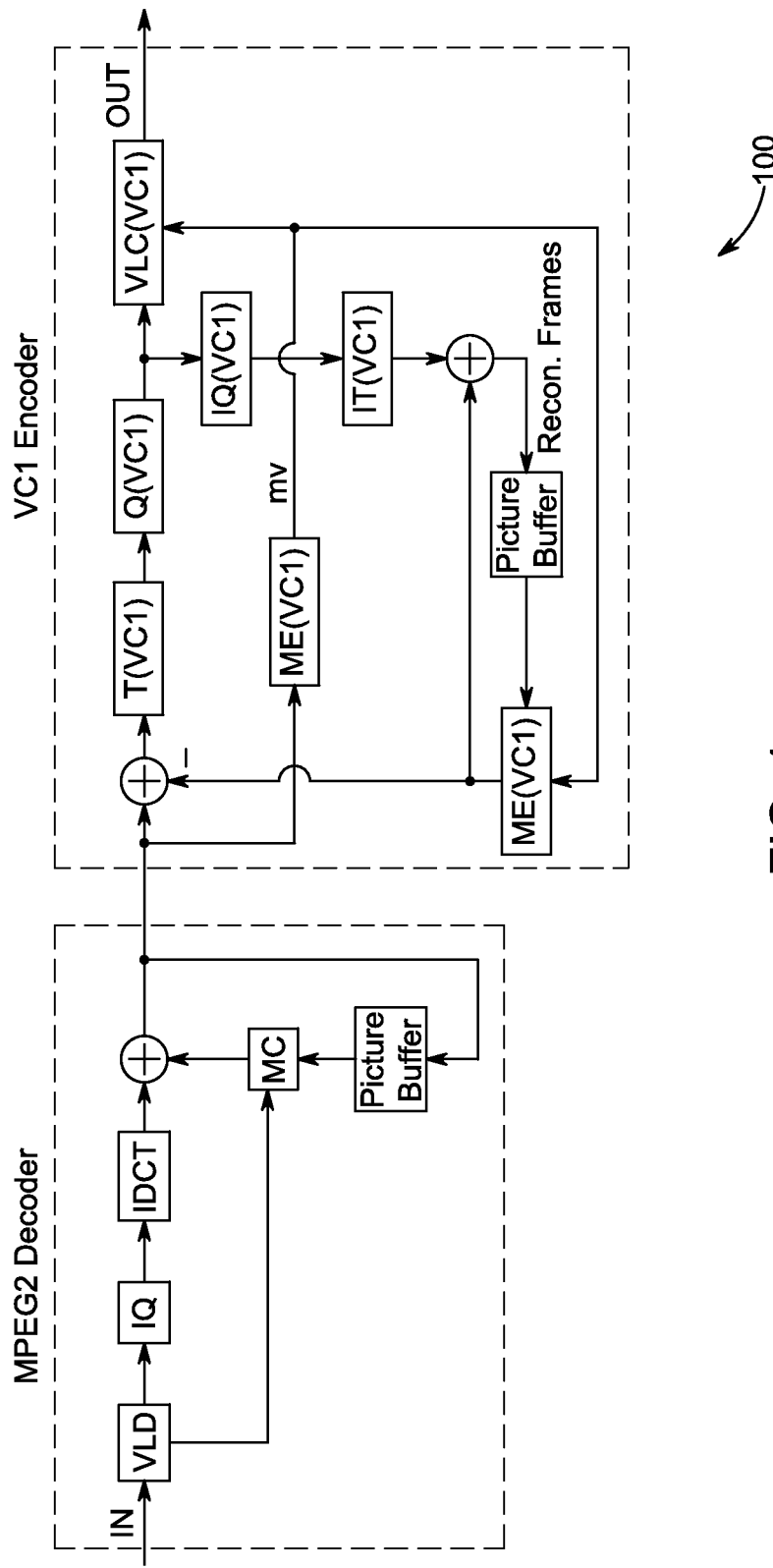
FIG. 1 illustrates a block diagram of a conventional transcoder for converting MPEG-2 to VC1 format.

The embodiments will be described in detail with reference to the accompanying drawings. However, any invention herein is not limited to the embodiments. The systems and methods can be modified in various forms. The disclosed embodiments are only provided to explain more clearly the systems and methods to ones ordinarily skilled in the art. In the accompanying drawings, like reference numerals are used to indicate like components.

Figure 2:
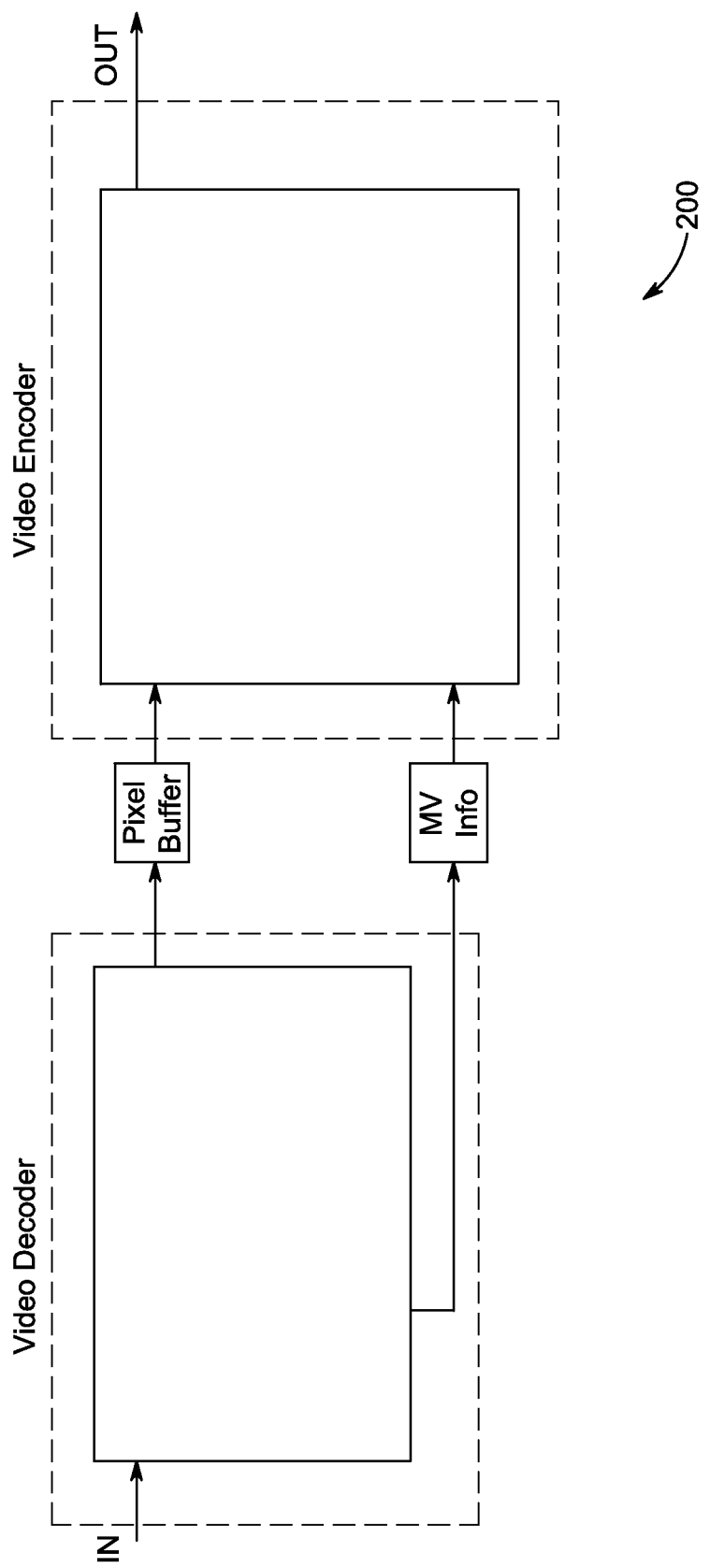
FIG. 2 illustrates a block diagram of a conventional transcoder.

FIG. 1 and FIG. 2 are already explained in the background section.

Figure 3:
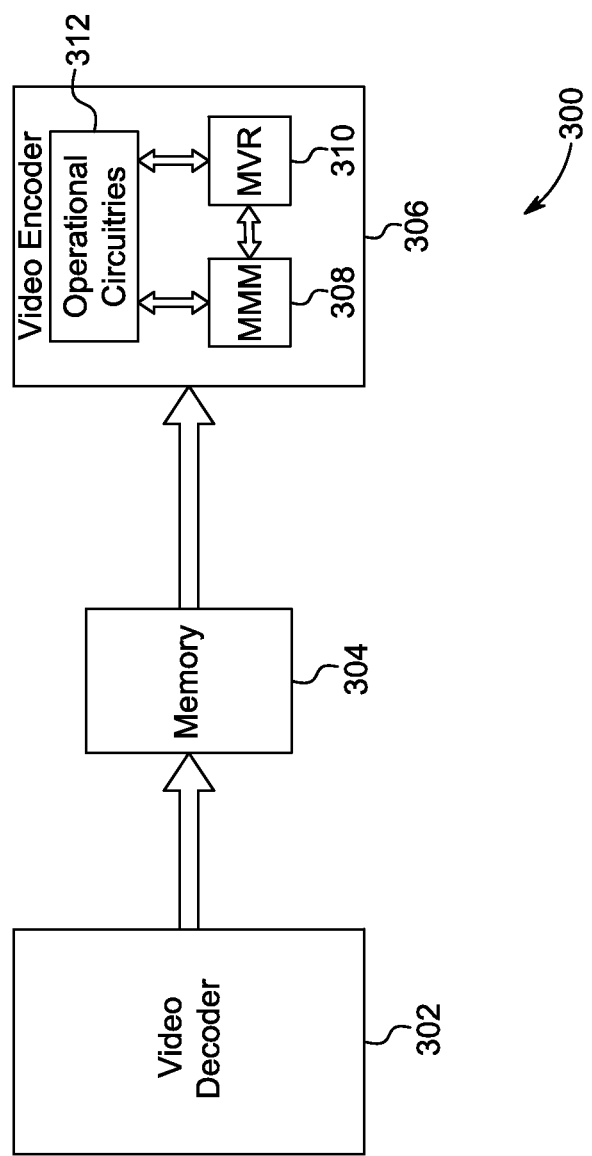
FIG. 3 illustrates a block diagram of a system for transcoding video signals from one standard to another according to an embodiment.

FIG. 3 illustrates a block diagram of a system 300 for transcoding video signals from one standard to another according to an embodiment. The system 300 includes a first module 302 and a second module 306. The system 300 further includes a memory module 304. The first module 302 is a video decoder module. The second module 306 is a video encoder module. The second module 306 includes a macroblock mapping module 308, a motion vector (MV) refinement module 310, and a module 312 having multiple operational circuitries. The memory module 304 is a shared memory shared between the first module 302 and the second module 306.

Figure 4:
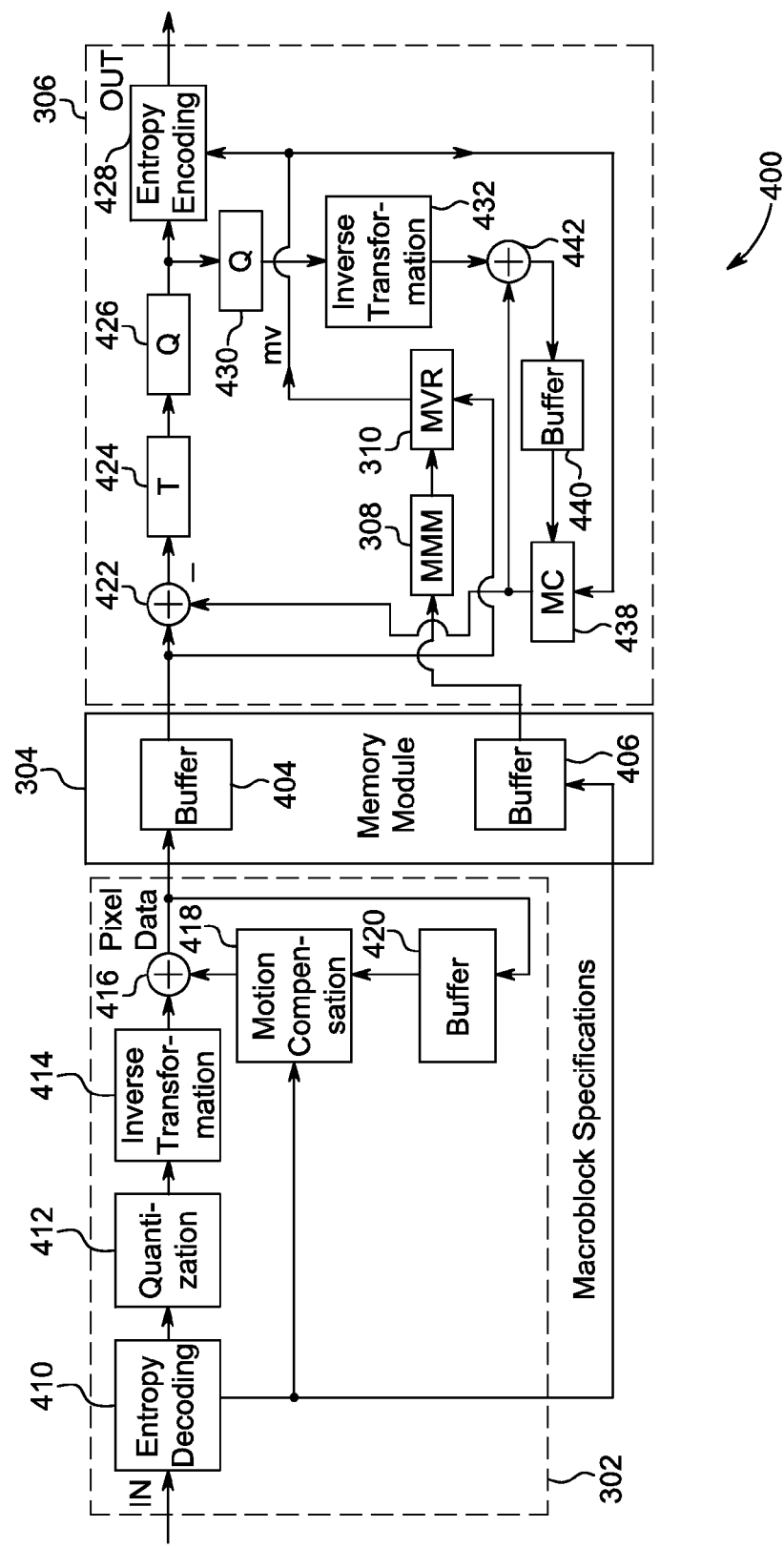
FIG. 4 illustrates a system for transcoding video signals from one standard to another according to another embodiment.

FIG. 4 illustrates a system 400 for transcoding an input video bit stream having a first encoding profile into an output video bit stream having a second encoding profile according to another embodiment. The system 400 includes a first module 302, a memory module 304, and a second module 306. The memory module 304 includes a first buffer module 404, and a second buffer module 406. The first module 302 decodes the input video bit stream for generating pixel data and macroblock specifications. The second module 306 encodes the pixel data and the macroblock specifications for constructing the output video bit stream. The first buffer module 404 stores the pixel data. The second buffer module 406 stores the macroblock specifications.

The first module 302 includes an entropy decoding module 410, a first quantization module 412, a first inverse transformation module 414, an adder 416, a first motion compensation (MC) module 418 and a first picture buffer 420. The entropy decoding module 410 decodes the input video bit stream into picture error data and the macroblock specifications. The first quantization module 412 processes the picture error data to obtain dequantized data. The first inverse transformation module 414 inverse transforms the dequantized data to obtain an error frame. The first motion compensation (MC) module 418 receives the macroblock specifications to produce a motion compensation frame. The motion compensation frame is appended with the error frame to produce a final picture. The first picture buffer 420 stores the final picture for a future reference. In an embodiment, the entropy decoding module 410 is a variable length decoding (VLD) module, the first quantization module is a first inverse quantization (IQ) module, and the first inverse transformation module is an inverse discrete cosine transform (IDCT) module.

The second module 306 includes a transform (T) module 424, a second quantization (Q) module 426, an entropy encoding module 428, a third quantization module 430, a second inverse transformation module 432, a macroblock (MB) mapping module 308, a motion vector (MV) refinement module 310, a second motion compensation (MC) module 438, a second picture buffer 440 and multiple adders such as 422 and 442. The transform (T) module 424 transforms a residual value. The residual value is a difference of a prediction value and a value of the pixel data. The second quantization (Q) module 426 quantizes the residual value for generating a quantized transform coefficient. The entropy encoding module 428 is used for entropy encoding of the quantized transform coefficient. The third quantization module 430 processes the quantized transform coefficient to obtain dequantized data. The second inverse transformation (IT) module 432 generates a difference frame. The macroblock (MB) mapping module 308 receives the macroblock specifications to generate a prediction value either in an inter mode or an intra mode. The motion vector (MV) refinement module 310 generates the prediction value through a reference picture in the inter mode. The second picture buffer 440 receives reconstructed frames to further storing. The second motion compensation (MC) module 438 receives motion information from the motion vector (MV) refinement module 310 and is coupled to the second picture buffer 440 to produce a motion compensated frame. In an embodiment, the entropy encoding module 428 is a variable length coding (VLC) module, and the third quantization module 430 is an inverse quantization (IQ) module.

In a preferred embodiment, the first encoding profile is a Moving Pictures Experts Group-2 (MPEG-2) standard and the second encoding profile is a Video Codec-1 (VC-1) standard. The system 400 for transcoding can be a closed loop transcoder. The first module 302 is an MPEG-2 decoder module 302 and the second module 306 is a VC1 encoder module 306. The first buffer module 404 is a shared frame buffer 404 and the second buffer module 406 is a shared MB information buffer 406. The transcoder 400 transcodes an input main profile MPEG-2 elementary stream to output profiles of the VC1 encoder 306. The input main profile can be a progressive and an interlaced MPEG-2 stream and the output stream profile of the VC1 encoder 306 can be progressive, interlace frame, and interlace field profiles.

The MPEG-2 input (IN) is decoded by the MPEG-2 decoder module 302 to a pixel level. The decoder module 302 fills pixel data in the shared frame buffer 404, and a macroblock specifications, such as, motion vectors, macroblock modes and other specifications such as a picture data, a picture width, a picture height, a frame rate, a picture type, an end of stream flag, a sequence frame number, motion vectors, a MV field select, a MB motion type, a MB DCT type and a MB type, are filled in the shared MB information buffer 406. The shared frame buffer 404 and the shared MB information buffer 406 are present in the transcoder's shared memory 304, which is shared between the MPEG-2 decoder module 302 and the VC1 encoder module 306. The Picture data refers to the frame pixel data obtained from the MPEG-2 decoder 302. The Picture data has three separate components as luma and two chroma in 4:2:0 formats. The picture width refers to a number of pixels in one row of the encoded MPEG-2 stream. The Picture height refers to number of pixels in one column of the encoded MPEG-2 stream. The frame rate refers to number of frames per second. The picture type refers to indicate the coding type for a picture i.e. I, P, B. The end of stream flag refers to a flag, which is set to 1 when the last frame of the stream is decoded. The sequence frame number refers to a current frame number in a decoding order. The motion vectors refers to vectors which are stored for each macroblock depending upon type Top (Frame)/Bottom, Forward/Backward, X/Y. The MV field select refers to a field MV indicating selection of reference top/bottom field. The MB motion type indicates the coding type of macroblock and the values used are INTRA, FIELD, FRAME, 16×8, DMV. The MB DCT type indicates the frame/field DCT type for current MB. The macroblock (MB) type indicates the direction of prediction, such as intra/forward/backward/interpolated/skipped for a macroblock (MB).

At the VC1 encoder 306 side, the VC1 encoder module 306 controls the encoding process by picking up the pixel data from the buffers, such as 404, 406, in the shared memory and reuses the macroblock specifications dumped by the decoder module 302 for encoding. This reuse of the macroblock specifications speeds up the conversion process. A transform (T) or a discrete cosine transform (DCT) refers to an invertible discrete orthogonal transformation. A quantize or quantization (Q) refers to a process in which the continuous range of values of an input signal is divided into non-overlapping (but not necessarily equal) sub ranges, and a discrete, unique value is assigned to each sub range. A unique index is generated to represent this value. A variable length coding (VLC) is a reversible procedure for coding that assigns shorter code word to frequent events and longer code words to less frequent events. An inverse quantization (IQ) is the process of resealing the quantized DCT coefficients after DCT coefficients representation in the bit stream has been decoded and before they are presented to the inverse DCT. An inverse discrete cosine transform (IT or IDCT) is an inverse process of the DCT. A motion compensation (MC) refers to the use of motion vectors to improve the efficiency of the prediction of sample values. The prediction uses motion vectors to provide offsets into the past and/or future reference frames or reference fields containing previously decoded sample values that are used to form the prediction error.

To obtain the best results, it is highly imperative to find a correct mapping of MB modes between the MPEG-2 decoder module 302 and the VC1 encoder module 306, before doing any kind of refinement. The MB mapping module 308 determines the best correspondence between the macroblock coding modes in the MPEG-2 decoder module 302 with available coding modes in the VC1 encoder module 306. The MV refinement module 310 refines half-pixel motion vectors obtained from the MPEG-2 decoder module 302 by using decoded picture data and macroblock mappings, hence taking full advantage of the compression techniques of VC1 standard and justifying the need for transcoding.

The amount of the specifications that can be reused plays a significant role in deciding the ultimate gain in transcoding speed obtained. The specifications such as a picture data, a picture width, a picture height, a frame rate, a picture type, an end of stream flag, a sequence frame number, motion vectors, an MV field select, an MB motion type, an MB DCT type and an MB type are shared by the transcoder 400. The VC1 encoder module 306 maps the MB modes obtained from the input MPEG-2 decoder module 302 bit stream to the available coding modes in VC1 encoder module 306 and each MB is designated in a most suitable coding mode, which is been done inside the MB mapping module 308. At this point, it is highly imperative to find the best mapping of MB modes between the modes available from incoming bit stream of the MPEG-2 decoder module 302 with those available in the VC1 encoder module 306 to make the best use of the available specifications. The resultant final quality output of the VC1 encoder module 306 depends highly on the efficiency of these mappings.

The motion vectors obtained from the bit streams of the MPEG-2 decoder module 302 are then refined by the MV refinement module 310. Since the original motion vectors are better approximation of a real motion than recomputed vectors calculated from quantized images; the complete blinded motion estimation process of the encoder is bypassed. Instead, motion vectors obtained at a half pixel resolution from the MPEG-2 decoder module 302 are refined to a finer resolution. The refinement process enhances the output quality and at the same time makes the motion vectors of the MPEG-2 decoder module 302 compliant with the VC1 standard. If no better MV for current MB is found, the original motion vectors of the MPEG-2 decoder module 302 are used and no refinement is done in this case. The MV refinement module 310 also takes care of the conversion of field MVs to a frame and vice versa by appropriate adjustment while accounting for the field or frame of reference. These refined motion vectors are then used to perform motion compensation inside the encoder. The process is continued for all the frames or fields of the sequence, one by one.

The following briefly explain the strategies for I, P, and B pictures in an output progressive, an interlaceframe, and an interlacefield mode. The detailed descriptions are given below:

Progressive Output Mode

A progressive mode of the MPEG-2 supports frame as well as field coded macroblocks. By the present method the macroblocks can be converted to all profiles, i.e., simple, main and advance, of VC1. The progressive output mode of the VC1 is present in the all profiles. The parameters extracted from the MPEG-2, such as picture data, picture width, picture height, frame rate, picture type, end of stream flag, sequence frame number, motion vectors, MV field select, MB motion type, MB DCT type and MB type, are used by VC1 encoder and have been mapped for skipped, intra, predicted and bi-directional MBs depending on their type and sub-type, i.e., frame or field with their motion vectors refined to finer levels. The macroblock mapping for the progressive output mode is illustrated in Table 1.

TABLE 1

Progressive (with interlace content) MPEG-2 Input to Progressive VC1 Output

| Frame Type | MPEG-2 MB Type | VC1 MB Type | Description |
| --- | --- | --- | --- |
| Intra (I) | Intra | Intra | Complete Encoding |
| Predicted(P) | Intra | Intra | Complete Encoding |
| | Frame Predicted | 1MV Forward | Half-pel MPEG-2 Motion Vector Refined to Quarter-pel resolution. |
| | Field Predicted | 1MV Forward | ScaleTop and Bottom Field MVs by a factor in order to reuse them as Frame MVs. Then choose the better of the two adjust polarity and Refine. |
| | Dual Prime | 1MV Forward | Scale and Select the best out of 4 MVs (Two for same parity and two for opposite parity) to obtain a Frame MV and Refine. |
| | Skipped | Intra/1MV Forward | In MPEG-2, the coding type of Skipped MB is Same as of the collocated MB type (Intra/Forward) in reference frame and hence it is encoded as per above procedures. |
| | — | Skipped | Decided by VC1 encoder and can override above decisions |
| Bi-Directional (B) | Intra | Intra | Complete Encoding |
| | Frame Predicted Forward | 1MV Forward | Half-pel MPEG-2 Forward Motion Vector Refined to Quarter-pel resolution. |
| | Field Predicted Forward | 1 MV Forward | Scale Top and Bottom Field MVs by a factor in order to reuse them as Frame MVs. Then choose the Better of the two, adjust polarity and Refine |
| | Frame Predicted Backward | 1MV Backward | Half-pel MPEG-2 Backward Motion Vectors Refined to Quarter-pel resolution |
| | Field Predicted Backward | 1MV Backward | Scale Top and Bottom Field MVs by a factor in order to reuse them as Frame MVs. Then choose the Better of the two, adjust polarity and Refine. |
| | Frame Interpolated | Interpolated | Half-pel MPEG-2 Forward and Backward Motion Vectors Refined to Quarter-pel resolution. |
| | Field Interpolated | Interpolated | Best Forward and Backward Field MVs are chosen as above and Refined. |
| | Skipped | 1MV Forward or 1MV Backward or Interpolated | Treated as same MPEG-2 coding type (Forward/Backward/Interpolated) as of the Last coded MB in the same Frame and encoded as per above procedures. |
| | — | Skipped | Decided by VC1 encoder and can override above decisions |

Interlace Frame Output Mode

An interlace frame mode of VC1 supports both frame or field coding of MBs inside a frame picture. This mode is present only in the advance profile of the VC1. Due to its support of both the frame and field coded MBs, the interlace frame environment yields itself very well to MPEG-2 progressive as well as interlaced input as its field coded MBs can be directly correlated to field MBs in the VC1 and hence can generate better quality output than progressive output. The parameters extracted from the MPEG-2, such as picture data, picture width, picture height, frame rate, picture type, end of stream flag, sequence frame number, motion vectors, MV field select, MB motion type, MB DCT type and MB type, are used by the VC1 encoder and have been mapped for skipped, intra, predicted and bi-directional MBs depending on their type and sub-type, i.e., frame or field with their motion vectors refined to finer levels. The macroblock mapping for the interlace frame output mode is illustrated in TABLE 2.

TABLE 2

Progressive (with interlace content) MPEG-2 Input to Interlace Frame VC1 Output.

| Frame Type | MPEG-2 MB Type | VC1 MB Type | Description |
|---|---|---|---|
| Intra (I) | Intra | Intra | Complete Encoding |
| Predicted (P) | Intra | Intra | Complete Encoding |
| | Frame Predicted | 1MV Forward | Half-pel MPEG-2 Motion Vector Refined to Quarter-pel resolution |
| | Field Predicted | 2 Field MV Forward | Half-pel Top and Bottom Field MPEG-2 MVs are assigned to Top and Bottom Fields, respectively in VC1 and Refined separately |
| | Dual Prime | 2 Field MV Forward | Select the better of the two Top Field MVs from MPEG-2 as the Top Field MV for VC1. Similarly, obtain the Bottom Field MV. Refine both the Top and Bottom Field VC1 MVs to Quarter pel, separately. |
| | Skipped | Intra/1MV Forward | Treated as same MPEG-2 coding type (Intra/Forward) as of the collocated MB in reference frame and encoded as per above procedures. |
| | — | Skipped | Decided by VC1 encoder and can override above decisions. |
| Bi-directional (B) | Intra | Intra | Complete Encoding |
| | Frame Predicted Forward | 1MV Forward | Half-pel MPEG-2 Forward Motion Vectors Refined to Quarter-pel resolution. |
| | Field Predicted Forward | 2 Field MV Forward | Top and Bottom Field MPEG-2 Forward MVs are assigned to Top and Bottom Fields as Forward MVs in VC1 respectively and each Refined individually. |
| | Frame Predicted Backward | 1MV Backward | Half-pel MPEG-2 Backward Motion Vectors Refined to Quarter-pel resolution. |
| | Field Predicted Backward | 2 Field MV Backward | Top and Bottom Field MPEG-2 Backward MVs are assigned to Top and Bottom Fields as Backward MVs in VC1 respectively and each Refined individually. |
| | Frame Interpolated | Interpolated | Best Forward and Backward Frame MVs are chosen as above and Refined |
| | Field Interpolated | Interpolated | Best Forward and Backward Field MVs |

TABLE 2-continued

Progressive (with interlace content) MPEG-2
Input to Interlace Frame VC1 Output.

| Frame Type | MPEG-2 MB Type | VC1 MB Type | Description |
|---|---|---|---|
| | Skipped | Forward or Backward Interpolated | are chosen as above and Refined. Treated as same MPEG-2 coding type (Field/Frame) (Forward/Backward/Interpolated) as of the Last coded MB in the same Frame and encoded as per above procedures. |
| | — | Skipped | Decided by VC1 encoder and can override above decisions. |

Interlacefield Output Mode

An interlacefield mode of VC1 supports only field coding of MBs inside a field picture. Hence, purely interlaced MPEG-2 inputs, containing field coded MBs, can be correlated with this mode of VC1. The parameters extracted from the MPEG-2, such as picture data, picture width, picture height, frame rate, picture type, end of stream flag, sequence frame number, motion vectors, MV field select, MB motion type, MB DCT type and MB type, are used by the VC1 encoder and have been mapped for skipped, intra, predicted and bi-directional MBs depending on their type and sub-type, i.e., frame or field with their motion vectors refined to finer levels. The macroblock mapping for the interlacefield output mode is illustrated in Table 3.

TABLE 3

Interlace MPEG-2 Input to InterlaceField VC1 Output

| Frame Type | MPEG-2 MB Type | VC1 MB Type | Description |
|---|---|---|---|
| Intra (I) | Intra | Intra | Complete Encoding |
| Predicted (P) | Intra | Intra | Complete Encoding |
| | Field Predicted | 1MV Forward | Half-pel MPEG-2 Motion Vectors Refined to Quarter-pel resolution. |
| | 16 × 8 | 4MV Forward | 1. Use Top Partition MPEG-2 MV as MVs for both the upper two 8 × 8 blocks of the current MB in VC1 and refine the motion vectors obtained from MPEG-2 at Half Pel resolution to Quarter Pel, individually, for both the upper 8 × 8 blocks. 2. Similarly, Use Bottom Partition MPEG-2 MV as MVs for both the lower two 8 × 8 blocks of the current MB in VC1 and refine the motion vectors obtained from MPEG-2 at Half Pel resolution to Quarter Pel, individually, for both the lower 8 × 8 blocks. |
| | Dual Prime | 1MV Forward | Select a better out of the 2 MVs (same and opposite polarity) and Refine |
| | Skipped | Intra/1MV Forward | Treated as same MPEG-2 coding type (Intra/Forward) as of the collocated MB in reference field of same polarity and encoded as per above procedures. |
| | — | Skipped | Decided by VC1 encoder and can override above decisions. |

TABLE 3-continued

Interlace MPEG-2 Input to InterlaceField VC1 Output

| Frame Type | MPEG-2 MB Type | VC1 MB Type | Description |
|---|---|---|---|
| Bi-directional (B) | Intra | Intra | Complete Encoding |
| | Field Predicted Forward | 1MV Forward | Half-pel MPEG-2 Forward Motion Vector Refined to Quarter-pel resolution. |
| | 16 × 8 Forward | 4MV Forward | 1. Use Top Partition Forward MPEG-2 MV as Forward MVs for both the upper two 8 × 8 blocks of the current MB in VC1 and refine the motion vectors obtained from MPEG-2 at Half Pel resolution to Quarter Pel, individually, for both the upper 8 × 8 blocks. 2. Similarly, Use Bottom Partition Forward MPEG-2 MV as Forward MVs for both the lower two 8 × 8 blocks of the current MB in VC1 and refine the motion vectors obtained from MPEG-2 at Half Pel resolution to Quarter Pel, individually, for both the lower 8 × 8 blocks. |
| | Field Predicted Backward | 1MV Backward | Half-pel MPEG-2 Backward Motion Vector Refined to Quarter-pel resolution. |
| | 16 × 8 Backward | 4 MV Backward | 1. Use Top Partition Backward MPEG-2 MV as Backward MVs for both the upper two 8 × 8 blocks of the current MB in VC1 and refine the motion vectors obtained from MPEG-2 at Half Pel resolution to Quarter Pel, individually, for both the upper 8 × 8 blocks. 2. Similarly, Use Bottom Partition Backward MPEG-2 MV as Backward MVs for both the lower two 8 × 8 blocks of the current MB in VC1 and refine the motion vectors obtained from MPEG-2 at Half Pel resolution to Quarter Pel, individually, for both the lower 8 × 8 blocks. |
| | Field Interpolated | 1MV Interpolated | Half-pel MPEG-2 Forward and Backward Motion Vectors Refined to Quarter-pel resolution. |
| | 16 × 8 Interpolated | 1MV Interpolated | 1. Out of the two Forward MVs (for both top and bottom 16 × 8 partitions), select the better one and use as Forward 1MV in VC1. Refine the resultant MV to Quarter Pel. 2. Similarly, Out of the two Backward MVs (for both top and bottom 16 × 8 partitions), select the better one and use as Backward 1MV in VC1. Refine the resultant MV to Quarter Pel. 3. Use above selected MVs and code as 1MV Interpolated. |

TABLE 3-continued

Interlace MPEG-2 Input to InterlaceField VC1 Output

| Frame Type | MPEG-2 MB Type | VC1 MB Type | Description |
|---|---|---|---|
| | Skipped | Forward or Backward or Interpolated | Treated as same MPEG-2 Field coding type (Forward/Backward/Interpolated) as of the Last coded MB in the current field and encoded as per above procedures. |
| | — | Skipped | Decided by VC1 encoder and can override above decisions |

Figure 5:
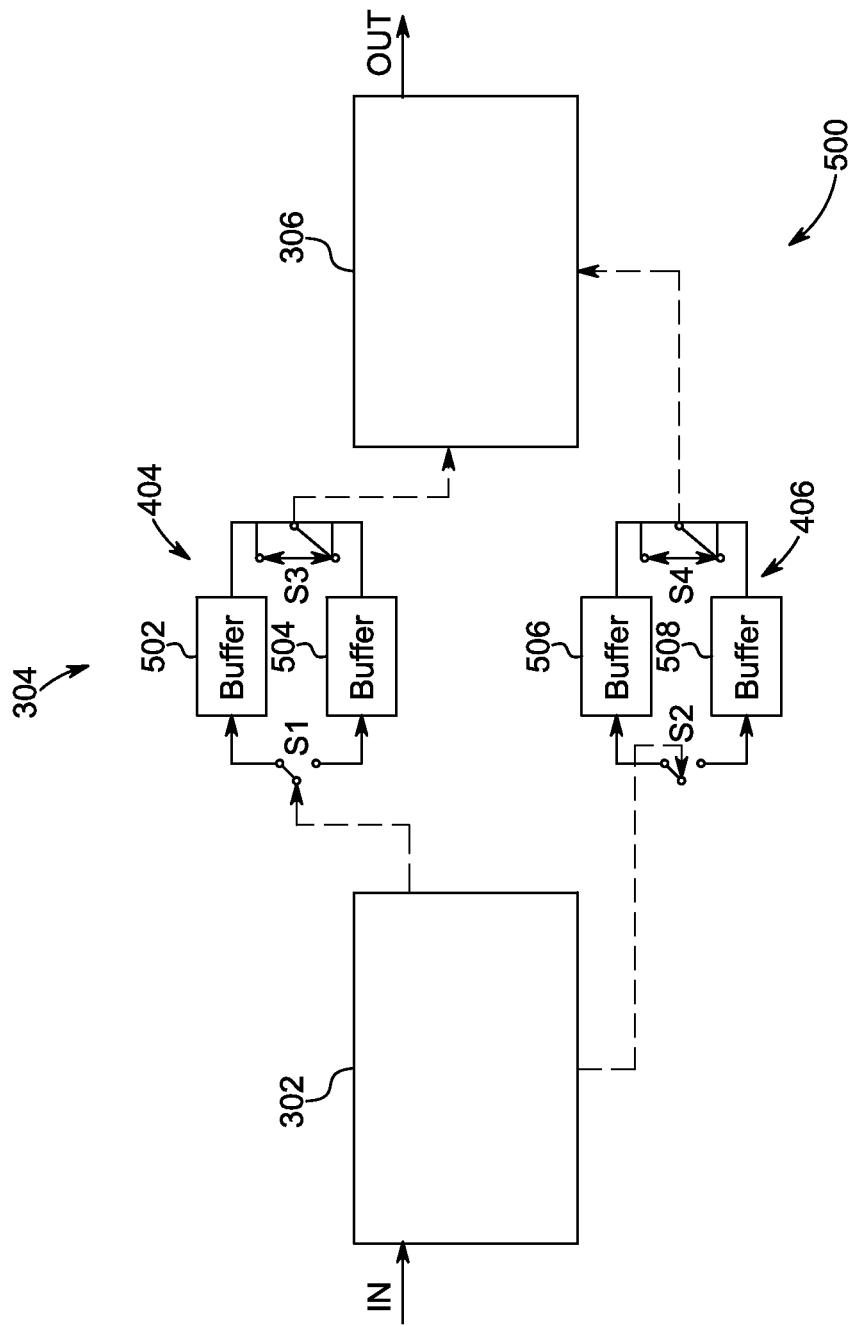
FIG. 5 illustrates a system for transcoding video signals from one standard to another according to yet another embodiment.

FIG. 5 illustrates a system 500 for transcoding an input video bit stream having a first encoding profile into an output video bit stream having a second encoding profile according to yet another embodiment of the present invention. The system 500 includes a first module 302, a memory module 304, and a second module 306. The memory module 304 includes a first buffer module 404, and a second buffer module 406. The first buffer module 404 includes a first global pixel data buffer 502, and a second global pixel data buffer 504. The second buffer module 406 includes a first global MB Info buffer 506, and a second global MB Info buffer 508. The module 404 and 406 also include switches 'S1', 'S2', 'S3' and 'S4' to control data flow.

Basically, there are two major types of transcoding architectures, which are open-loop architectures and closed-loop architectures. The open-loop architectures do not have a feedback loop which is responsible for the reconstruction process at the encoding side. This leads to a mismatch between the encoder and decoder predictors resulting in the accumulation of an error in a sequence of pictures. The error is called a drift error. The closed-loop architectures achieve the reconstruction process via the feedback loop which completely removes the drift error. In an embodiment of present invention, the system 500 is closed-loop type architecture and hence eliminates the drift error.

According to an embodiment of the present invention, the working of the system 500 is explained. An input compressed video bitstream is fed into the video decoder for decoding using standard decoder procedures. Referring to FIG. 5, the first module module 302 uses a variable length decoding (VLD), an inverse quantization (IQ), an inverse DCT (IDCT) and motion compensation (MC) techniques to retrieve the decoded image. These processes are at least included in decoding of other standard and may also support some other specific decoding features but will finally obtain pixel level video information. The decoding to pixel level helps to avoid the drift error in the encoding phase. The pixel data for the first input frame is then filled into the first global pixel data buffer 502 by controlling the data flow using the switch S1. At the same time, all the side specifications like MB mode, Motion Vectors, DCT Type, GOP, frame type, frame size, frame rate etc., which was obtained from the decoder along with the pixel data for first frame, is stored in the first global MB info buffer 506 by controlling the data flow using the switch S2.

The amount of side specifications that can be reused plays a significant role in deciding the ultimate gain in transcoding speed obtained and depends on the degree of correlation between the input bitstream's standard and VC-1. The gain in transcoding speed is possible due to the fact that expensive operations, like a motion estimation at the encoder can be avoided by using already present specifications in the original stream, such as the motion vectors and the macroblock modes. In an embodiment of the present invention, the system 300 reuses the available specifications from the input bitstream to act as a "fast encoder". The system most important coding decisions are inferred from the input bitstream itself. Due to the high correlation between the two standards such as MPEG-2 and VC1, owing to the fact that VC1 is almost like a superset of MPEG-2, much of specifications already present in the input bitstream could be reused leading to high gain in speed. The specifications which were reused from MPEG-2 are Picture data, Picture Width, Picture Height, Frame Rate, Picture Type, End of Stream Flag, Sequence Frame Number, Motion Vectors, MV Field Select, MB Motion Type, MB DCT Type, and MB Type.

Referring to FIG. 5, the complete decoding of the first frame is achieved, a signal is sent to the second module 306 to start the encoding process by reusing the pixel data and the side specifications dumped by the first module 302. In an embodiment, the first module 302 is the decoder 302 and the second module 306 is the encoder 306. This data is picked up by placing the switches S3 and S4 pointing to the first global pixel data buffer 502 and the first global MB Info buffer 506 respectively. As soon as the signal is sent to the encoder 306, the switches S1 and S2 toggle their positions to point to the second global pixel data buffer 504 and the second global MB Info buffer 508 respectively and immediately the decoding of the next frame commences and the pixel data and the side specifications is dumped in their respective buffers. After decoding the second frame, the decoder 302 enters a sleep mode and waits for the encoder 306 to complete its encoding of the first frame and release its control from the first global pixel data buffer 502 and the first global MB Info buffer 506.

Figure 7:
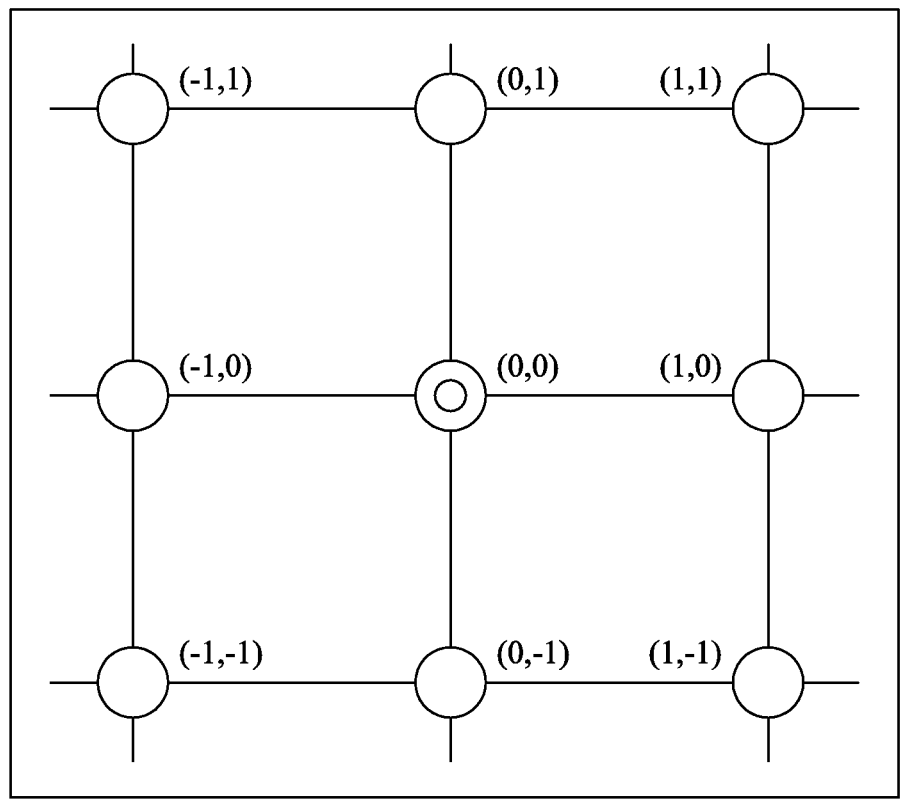
FIG. 7 illustrates a motion estimation process according to an embodiment.

Meanwhile, the encoder 306 is still encoding its first frame. The second module 306 controls the encoding process by picking up pixel data from the buffers pointed to by the switches S3 and S4 and reuses the specifications. As a next step, macroblock modes obtained from input bitstream (in the present embodiment of MPEG-2) are mapped in the MB mapping module 308 with the available coding modes in VC1 and each macroblock is designated a most suitable coding mode. At this point, it is highly imperative to find the best mapping of MB modes between the modes available from incoming bitstream and available coding modes in VC1, before doing any kind of refinement, in order to take full advantage of the compression techniques of VC1 standard. After a suitable mode is designated to the output MB, the motion vectors obtained from the input bitstream are refined in the MV refinement module 310. Since, the original motion vectors are normally a better approximation of the real motion than recomputed vectors starting from the input quantized images, the complete blinded motion estimation process of the encoder is bypassed and instead, the motion vectors obtained from the input bitstream are refined. Depending upon the input bitstream, these motion vectors can either be at a half pel or a quarter pel resolution. In the case of the half pel resolution, which was the case for MPEG-2 bitstream, the motion vectors are then refined to the quarter pel resolution to enhance the output quality. In the case of the quarter pel resolution as well, the motion vectors are refined which makes them compliant with the VC1 standard. The refinement process is used in transcoding as illustrated in FIG. 7. The refinement process is based on Sum of Absolute Differences (SAD). Finally, the VC1 bitstream is coded by using these refined motion vectors to perform motion compensation and the transformed and quantized prediction error is entropy coded.

Again referring to FIG. 5, the encoder 306 sends a signal to the decoder 302 after the completion of the encoding process for the first frame and at the same time releasing its hold on the first global pixel data buffer 502 and the first global MB info buffer 506 but taking control over the second global pixel data buffer 504 and the second global MB info buffer 508, which contains the pixel and side specifications obtained after decoding the second frame. The decoder 302 acknowledges this signal and starts decoding the specifications into the first global pixel data buffer 502 and the first global MB info buffer 506.

At this point the decoder 302 and the encoder 306 work simultaneously on their respective global memories. The former decodes the third frame of the input sequence and again enters sleep state and waits for the encoder 306 to finish its current task i.e. encoding the second frame into the output sequence. The process continues for the remaining of the sequence.

Figure 6:
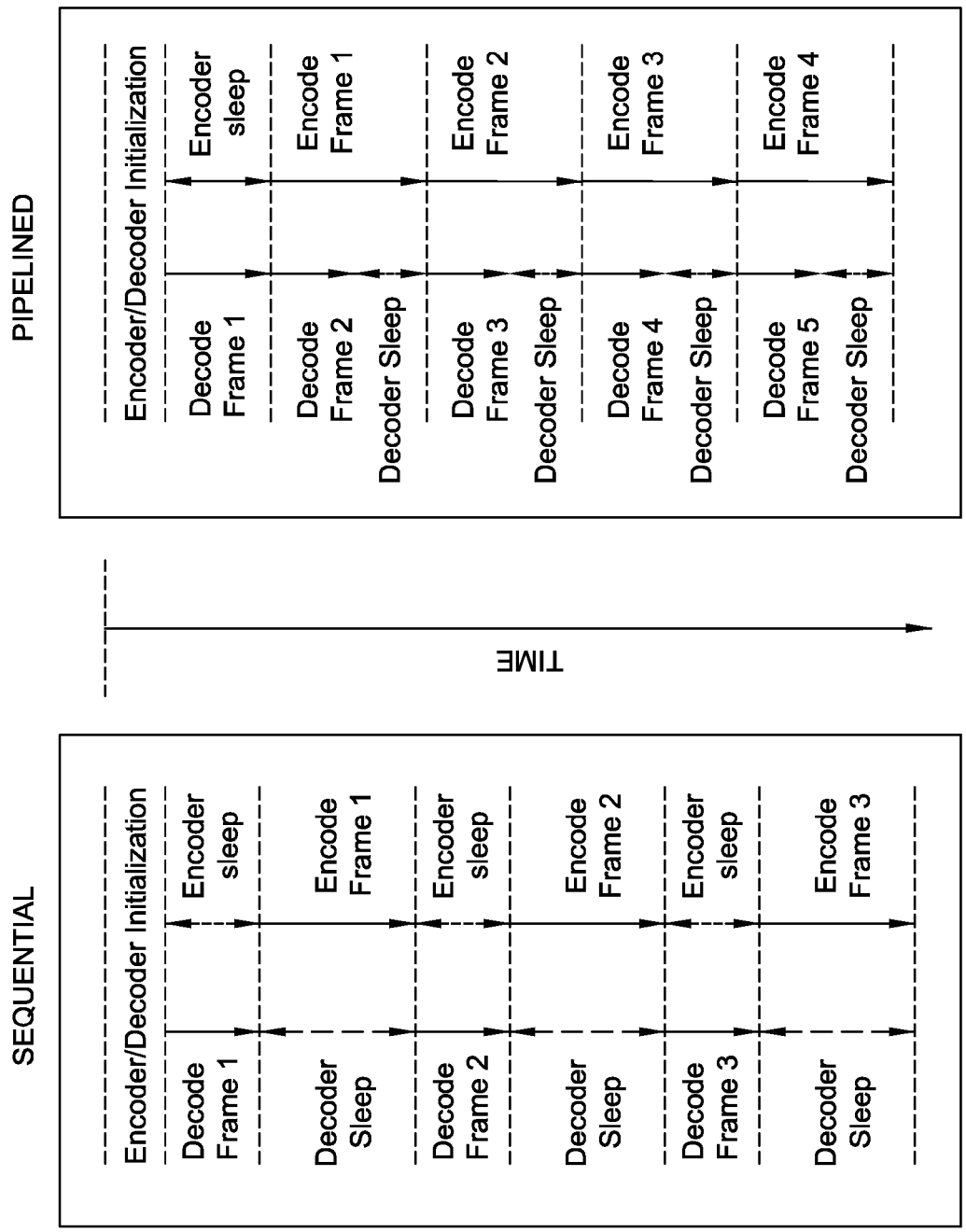
FIG. 6 illustrates a timing diagram for a pipelined process and a sequential process.

FIG. 6 illustrates a timing diagram for a pipelined process and a sequential process and their comparison. Using a sequential approach, after the initialization of the decoder 302 and the encoder 306, only one process is working at any instance, i.e. when the decoder 302 is in operation, the encoder 306 is sleeping and vice versa. Hence it does not utilize all the resources completely. Whereas, the pipelined approach optimizes the utilization of the resources to the theoretical maximum level. In this approach, after the initialization of the decoder/encoder, the encoder 306 waits only once during the whole process, i.e. while the first frame is decoded and never goes to a sleep state after that. Hence, the encoder 306 eliminating an encoding sleep time once the encoding starts. The decoder 302 meanwhile, waits for a very brief period after each decode. Hence, the decoder 302 reduces a decoding sleep time.

As mentioned above, the systems and methods are also compatible for an input streams coded in interlaced format. For the particular embodiment of the MPEG-2 to VC1 transcoder, purely an Interlaced input was transcoded to an InterlaceField VC1 format. The method was entirely similar to that used for progressive input streams except for the fact that the transcoding is done one field at a time. This means that as one field (assuming Top Field) is decoded and put into the global buffers, then it is picked up by the encoder 306 and encoded into a final stream and at the same time the decoder 302 decodes the next field (assuming Bottom Field) and waits for encoder to finish encoding the previous field. Hence the process continues in similar fashion.

The new pipelined approach can provide large gains as compared to the sequential approach in cases, where the time taken for decoding is comparable to that taken for encoding i.e. the decoder 302 and the encoder 306 has comparable complexities. In such cases, the decoder 302 sleep time after each decode is minimized.

FIG. 7 illustrates the motion estimation process for a macroblock (MB) in the VC1 encoder 306, which is completed in three main steps, according to an embodiment of the present invention. First, a full pel motion vector (MV) is searched, in a window of defined size, using a block motion estimation algorithm. Second, the full pel motion vector calculated in the above step is then refined to a half pel level by searching at eight positions having an offset of a half pixel around that position. If a better match is found in one of these positions, then that specific position is selected as the new motion vector. Third, similarly around the best match half pel location another set of eight positions, at an offset of a quarter pixel are searched to refine to a quarter pel level. The best match in this step (or the best match calculated in the second step, whichever gives lesser Sum of Absolute Differences (SAD)) is the final motion vector (MV) that is chosen for the macroblock. This is to be noted that if a better match (lesser SAD) is not found in last two steps, then the MV calculated in a full pel terms is coded in a Qpel terms In the present transcoding environment, the first two steps are bypassed, since the present methodology receives already refined motion vectors from an input. For the particular embodiment of MPEG-2, motion vectors in a half pel resolution are received. Which means that as per FIG. 7, the method already have the point (0,0) and now has to find a better match out of other eight Qpel positions around this position, if exists. Even if the input motion vectors are in the Quarter Pel format, as is in the case of standards like H.264, the point of best match pointed to by the motion vector received from the input, can be taken as the (0,0) position and compared with eight Q-pel positions around it.

Hence, by this modification the present invention differs from the conventional method. Since at this point of origin, SAD value is not available to compare the others with, SAD is calculated at this (0, 0) location. This is then compared with the other eight Qpel positions and the final position is chosen among these nine points which has the minimum SAD which can also be the (0, 0) position itself.

Figure 8:
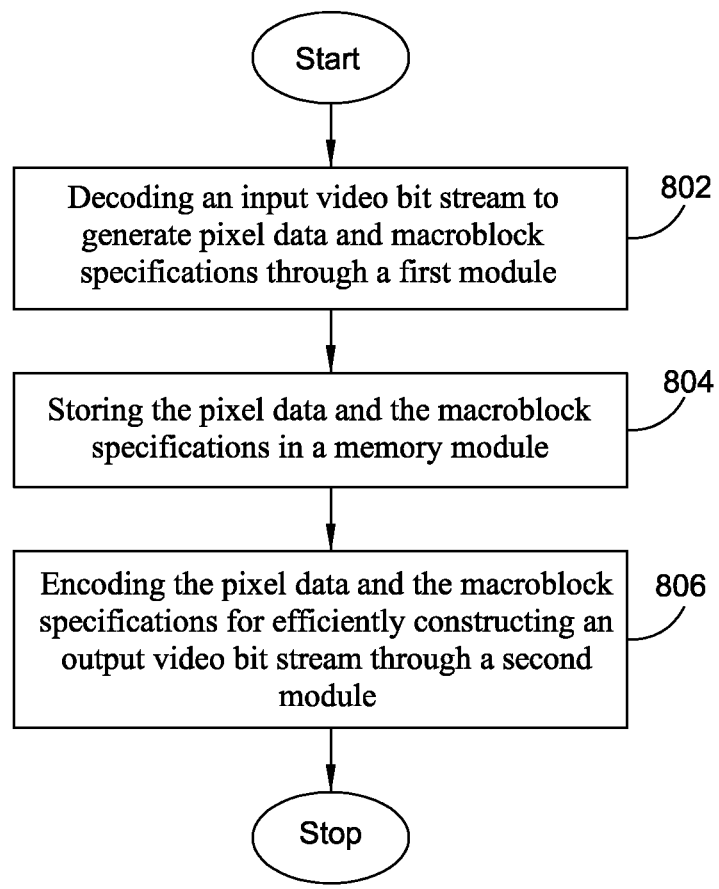
FIG. 8 illustrates a flow diagram of a method for transcoding video signals from one standard to another according to an embodiment.

FIG. 8 illustrates a flow diagram of a method for transcoding according to an embodiment of the present invention. At step 802, the input video bit stream is decoded to generate pixel data and macroblock specifications through a first module. At step 804, the pixel data and the macroblock specifications are stored in a memory module. At step 806, the pixel data and the macroblock specifications are encoded for efficiently constructing the output video bit-stream through a second module.

The embodiment(s) can be used in various applications, such as, video encoding, video recording, video processing and other video communications.

The embodiment(s) describes a system and method of transcoding video data from one standard to another, which offers many advantages. Firstly, the reuse of macroblock specifications speeds up the conversion process. Secondly, the present methodology relies on the efficient MB mappings and innovative use of other macroblock (MB) specifications such as, picture data, picture width, picture height, frame rate, picture type, end of stream flag, sequence frame number, motion vectors, MV field select, MB motion type, MB DCT type and MB type, without compensating on the quality and saving on time. Thirdly, the present architecture is compliance with the Windows Media Video-9 (WMV-9) codec, which is mandatory for the next generation HD DVD format.

Although the disclosure of system and method has been described in connection with one or more embodiments illustrated in the accompanying drawings, it is not limited thereto. It will be apparent to those skilled in the art that various substitutions, modifications and changes may be made thereto without departing from the scope and spirit of the disclosure.

We claim:

1. A system for encoding pixel data and macroblock specifications of a first encoding profile to construct an output video bit stream of a second encoding profile, said system comprising:
    a macroblock mapping module configured to receive the macroblock specifications and generate a prediction value in one of an inter mode and an intra mode, said macroblock specifications including a motion vector at a first pixel resolution value;
    a motion vector refinement module configured to generate the prediction value through a reference picture in the inter mode and refine the motion vector to a higher second pixel resolution;
    a transform module configured to transform a residual value, said residual value comprising a difference of the prediction value and a value of the pixel data;
    a second quantization module configured to quantize the residual value and generate a quantized transform coefficient;
    an entropy encoding module configured to entropy encode the quantized transform coefficient;
    a third quantization module configured to process the quantized transform coefficient to obtain dequantized data;
    a second inverse transformation module configured to generate a difference frame;
    a second picture buffer configured to store reconstructed frames; and
    a second motion compensation module configured to receive motion information from the motion vector refinement module and coupled to the picture buffer to produce a motion compensated frame.

2. The system of claim 1 further comprising a memory module configured to store the pixel data and the macroblock specifications.

3. The system of claim 2, wherein said memory module comprising:
    a first buffer module configured to alternately store the pixel data into first and second pixel buffers; and
    a second buffer module configured to alternately store the macroblock specifications into first and second macroblock buffers.

4. The system of claim 1, wherein said entropy encoding module performs a variable length coding.

5. The system of claim 1, wherein said first encoding profile uses one of a Moving Pictures Experts Group-2 (MPEG-2) standard, and a Moving Pictures Experts Group-4 (MPEG-4) standard.

6. The system of claim 5, wherein said second encoding profile uses one of a Video Codec-1 (VC-1) standard, a H.264 standard, and a Windows Media Video 9 (WMV-9) standard.

7. The system of claim 1, wherein converting from the first pixel resolution to the higher second pixel resolution comprises searching, at a plurality of positions around a point of origin of said motion vector at the first pixel resolution, said plurality of positions offset from the point of origin by a fraction of the first pixel resolution, for a point of best match pointed towards by said motion vector, and identifying a vector for that point of best match as the refined motion vector.

8. A method for transcoding an input video bit stream having a first encoding profile into an output video bit stream having a second encoding profile comprising:
    decoding the input video bit stream to generate pixel data and macroblock specifications through a first module, said macroblock specifications including a motion vector at a first pixel resolution value;
    storing the pixel data and the macroblock specifications in a memory module; and
    encoding the pixel data and the macroblock specifications retrieved from the memory module for constructing the output video bit stream through a second module;
    wherein encoding comprises converting the motion vector at the first pixel resolution to a refined motion vector at a second pixel resolution that is higher than the first pixel resolution;
    wherein said encoding comprising:
        generating a prediction value in one of an inter mode and an intra mode through a macroblock mapping module;
        generating the prediction value in the inter mode using a reference picture through a motion vector refinement module;
        transforming a residual value through a transform module, said residual value comprises a difference of the prediction value and a value of the pixel data;
        quantizing the residual value for generating a quantized transform coefficient through a second quantization module;
        encoding the quantized transform coefficient through an entropy encoding module;
        processing the quantized transform coefficient to obtain dequantized data through a third quantization module; and
        generating a difference frame through a second inverse transformation module.

9. The method of claim 8, wherein said decoding comprising:
    processing the input video bit stream to generate picture error data and the macroblock specifications;
    processing the picture error data to obtain the dequantized data;
    transforming the dequantized data to obtain an error frame;
    producing a motion compensation frame from the macroblock specifications, said motion frame being appended with the error frame to produce a final picture; and
    storing the final picture for a future reference in a first picture buffer.

10. The method of claim 8, wherein said storing comprises storing the pixel data alternatively into a first global pixel data buffer and a second global pixel data buffer, and storing the macroblock specifications alternatively into a first global macroblock information buffer and a second global macroblock information buffer for reducing a decoding sleep time.

11. The method of claim 10, wherein said encoding comprises encoding alternatively the pixel data stored in the first global pixel data buffer and the second global pixel data buffer, and encoding alternatively the macroblock specifications stored in the first global macroblock information buffer and the second global macroblock information buffer for eliminating an encoding sleep time once the encoding starts for constructing the output video bit stream.

12. A method for transcoding an input video bit stream having a first encoding profile into an output video bit stream having a second encoding profile comprising:
  decoding the input video bit stream to generate pixel data and macroblock specifications through a first module;
  storing the pixel data and the macroblock specifications in a memory module; and
  encoding the pixel data and the macroblock specifications for constructing the output video bit stream through a second module;
  wherein said storing comprises storing the pixel data alternatively into a first global pixel data buffer and a second global pixel data buffer, and storing the macroblock specifications alternatively into a first global macroblock information buffer and a second global macroblock information buffer;
  wherein said decoding comprises:
    processing the input video bit stream to generate picture error data and the macroblock specifications;
    processing the picture error data to obtain dequantized data
    transforming the dequantized data to obtain an error frame;
    producing a motion compensation frame from the macroblock specifications, said motion frame being appended with the error frame to produce a final picture; and
    storing the final picture for a future reference in a first picture buffer.

13. The method of claim 12, wherein said encoding comprises encoding alternatively the pixel data stored in the first global pixel data buffer and the second global pixel data buffer, and encoding alternatively the macroblock specifications stored in the first global macroblock information buffer and the second global macroblock information buffer.

14. A method for transcoding an input video bit stream having a first encoding profile into an output video bit stream having a second encoding profile,
  decoding the input video bit stream to generate pixel data and macroblock specifications through a first module;
  storing the pixel data and the macroblock specifications in a memory module; and
  encoding the pixel data and the macroblock specifications for constructing the output video bit stream through a second module;
  wherein said storing comprises storing the pixel data alternatively into a first global pixel data buffer and a second global pixel data buffer, and storing the macroblock specifications alternatively into a first global macroblock information buffer and a second global macroblock information buffer;
  wherein said encoding comprises:
    generating a prediction value in one of an inter mode and an intra mode through a macroblock mapping module;
    generating the prediction value in the inter mode using a reference picture through a motion vector refinement module;
    transforming a residual value through a transform module, said residual value comprises a difference of the prediction value and a value of the pixel data;
    quantizing the residual value for generating a quantized transform coefficient through a second quantization module;
    encoding the quantized transform coefficient through an entropy encoding module;
    processing the quantized transform coefficient to obtain dequantized data through a third quantization module; and
    generating a difference frame through a second inverse transformation module.

15. A system for transcoding an input video bit stream having a first encoding profile into an output video bit stream having a second encoding profile, comprising:
  a first module configured to decode the input video bit stream to generate pixel data and macroblock specifications;
  a memory module comprising:
    a first buffer module configured to store the pixel data; and
    a second buffer module configured to store the macroblock specifications; and
  a second module operatively coupled to the first module, said second module comprising a macroblock mapping module and a motion vector refinement module configured to encode the pixel data and the macroblock specifications to construct the output video bit stream;
  wherein the first buffer module of said memory module is configured to store the pixel data alternatively into a first global pixel data buffer and a second global pixel data buffer, and
  wherein the second buffer module of said memory module is configured to store the macroblock specifications alternatively into a first global macroblock information buffer and a second global macroblock information buffer;
  wherein the second module comprises:
    a transform module configured to transform a residual value, said residual value comprising a difference of a prediction value and a value of the pixel data;
    a second quantization module configured to quantize the residual value and generate a quantized transform coefficient;
    an entropy encoding module configured to encode the quantized transform coefficient;
    a third quantization module configured to process the quantized transform coefficient to obtain dequantized data;
    a second inverse transformation module configured to generate a difference frame;
    a second picture buffer configured to store reconstructed frames; and
    a second motion compensation module configured to receive motion information from the motion vector refinement module, said second motion compensation module being coupled to the second picture buffer and configured to produce a motion compensated frame.

16. The system of claim 15, where the second module is configured to encode alternatively the pixel data stored in the first global pixel data buffer and the second global pixel data buffer, and encode alternatively the macroblock specifications stored in the first global macroblock information buffer and the second global macroblock information buffer.

17. The system of claim 15, wherein said first module comprises:
  an entropy decoding module configured to decode the input video bit stream into picture error data and the macroblock specifications;
  a first quantization module configured to process the picture error data to obtain dequantized data;

a first inverse transformation module configured to inversely transform the dequantized data to obtain an error frame;
a first motion compensation module configured to produce a motion compensation frame from the macroblock specifications, said motion frame being appended with the error frame to produce a final picture; and
a first picture buffer configured to store the final picture.

* * * * *

UNITED STATES PATENT AND TRADEMARK OFFICE
CERTIFICATE OF CORRECTION

| | | |
|---|---|---|
| PATENT NO. | : 8,428,142 B2 | Page 1 of 1 |
| APPLICATION NO. | : 12/042300 | |
| DATED | : April 23, 2013 | |
| INVENTOR(S) | : Sumit Johar et al. | |

It is certified that error appears in the above-identified patent and that said Letters Patent is hereby corrected as shown below:

On the Title Page:

Item (30) is missing one priority claim and should be replaced in its entirety as follows:

-- (30)      Foreign Application Priority Data

Mar. 5, 2007     (IN) ................................. 478/DEL/2007

Mar. 4, 2008     (IN) ................................. 478/DEL/2007 --.

In the Specification:

At column 6, line number 13, please replace [resealing] with -- rescaling --.

Signed and Sealed this
Fourth Day of June, 2013

Teresa Stanek Rea
*Acting Director of the United States Patent and Trademark Office*